US005588147A

United States Patent [19]
Neeman et al.

[11] Patent Number: 5,588,147
[45] Date of Patent: Dec. 24, 1996

[54] REPLICATION FACILITY

[75] Inventors: Yuval Neeman, Bellevue; Peter Cook, Redmond; Arnold S. Miller, Bellevue; Balan Raman, Redmond, all of Wash.

[73] Assignee: Microsoft Corporation, Redmond, Wash.

[21] Appl. No.: 181,704

[22] Filed: Jan. 14, 1994

[51] Int. Cl.$^6$ .................................................. G06F 13/00
[52] U.S. Cl. ........................ 395/601; 395/800; 395/427
[58] Field of Search ................................... 395/600, 700, 395/575, 425, 275, 325, 200

[56] References Cited

U.S. PATENT DOCUMENTS

| | | | |
|---|---|---|---|
| 4,432,057 | 2/1984 | Daniell et al. | 39/600 |
| 4,714,996 | 12/1987 | Gladney et al. | 395/600 |
| 4,853,843 | 8/1989 | Ecklund | 395/600 |
| 4,875,159 | 10/1989 | Cary et al. | 395/600 |
| 4,887,204 | 12/1989 | Johnson et al. | 395/600 |
| 4,888,681 | 12/1989 | Barnes et al. | 395/600 |
| 5,001,628 | 3/1991 | Johnson et al. | 395/600 |
| 5,032,979 | 7/1991 | Hecht et al. | 395/575 |
| 5,113,519 | 5/1992 | Johnson et al. | 395/600 |
| 5,151,989 | 9/1992 | Johnsont et al. | 395/600 |
| 5,170,480 | 12/1992 | Mohem et al. | 395/600 |
| 5,202,971 | 4/1993 | Henson et al. | 395/425 |
| 5,222,217 | 6/1993 | Blount et al. | 395/325 |
| 5,285,528 | 2/1994 | Hart | 395/725 |
| 5,287,453 | 2/1994 | Roberts | 395/200 |
| 5,307,481 | 4/1994 | Shimazaki et al. | 395/575 |
| 5,313,646 | 5/1994 | Hendricks et al. | 395/600 |
| 5,333,265 | 7/1994 | Orimo et al. | 395/200 |

OTHER PUBLICATIONS

Purdin, Titus D. M. et al., "A File Replication Facility for Berkeley Unix," *Software –Practice and Experience*, vol. 17(12):923–940, Dec., 1987.

Fowler, Glenn et al., "A User–Level Replicated File System," *In Proceedings of the Summer 1993 USENIX Technical Conference*, Cincinnati, Ohio, Jun. 21–25, 1993: pp. 279–290.

"Xcopy Function for Access Control Profiles," *IBM Technical Disclosure Bulletin*, vol. 37(1):573–574, Jan., 1994.

Wedde, Horst F. et al., "Operating System Support for Adaptive Distributed Real–Time Systems in Dragon Slayer," *Operating Systems Review*, vol. 23(3):126–136, Jul., 1989.

Campbell, Roy H., and Peter W. Madany, "Considerations of Persistence and Security in Choices, an Object–Oriented Operating System," *In Proceedings on the International Workshop on Computer Architectures to Support Security and Persistence of Information*, May 8–11, 1990: pp. 290–300.

Hac, Anna, "A Distributed Algorithm for Performance Improvement Through File Replication, File Migration, and Process Migration," *IEEE Transactions on Software Engineering*, vol. 15(11):1459–1470, Nov., 1989.

Bruce Walker et al., "The LOCUS Distributed Operating System," *Operating Systems Review* 17(15): pp. 49–70, Oct. 1983.

Sally J. Martin et al., "Development of the VAX Distributed Name Service," *Digital Technical Journal* 9: pp. 9–15, Jun. 1989.

(List continued on next page.)

*Primary Examiner*—Thomas G. Black
*Assistant Examiner*—C. Pham
*Attorney, Agent, or Firm*—Seed & Berry

[57] ABSTRACT

A replication facility provides for the replication of files or portions of files in a distributed environment. The replication facility is able to replicate any subtree within a distributed namespace of the distributed environment. The replication facility provides multi-mastered, weakly consistent replication. The replication facility supports both public replication and private replication.

29 Claims, 6 Drawing Sheets

OTHER PUBLICATIONS

George F. Coulouris and Jean Dollimore, "Distributed Systems –Concepts and Design," Sections 8.4 and 10.9: pp. 211–225 and 293–299.

Mahadev Satyanarayanan, "Scalable, Secure, and Highly Available Distributed File Access," *IEEE*: pp. 9–21, May 1990.

Alex Siegel et al., "Deceit: A Flexible Distributed File System," *Technical Report for Department of Computer Science, Cornell University, Ithaca, New York*, pp. 1–34, Nov. 1989.

Mark Schulman, *Que's Guide to Lotus Notes*, pp. 51–55 and 268–312, 1993.

Doug Bierer et al., *NetWare 4 for Professionals*, New Riders Publishing: pp. 343–374, 420–421, 432–435 and 971–1045, 1993.

Mahadev Satyanarayanan et al., "Coda: A Highly Available File System for a Distributed Workstation Environment," *IEEE* 19(4): pp. 447–459, 1990.

REPLICATION FACILITY

TECHNICAL FIELD

The present invention relates generally to data processing systems and, more particularly, to replication facilities used within distributed systems.

BACKGROUND OF THE INVENTION

Replication facilities have been provided in a number of different types of software products. For instance, replication facilities have been incorporated in database products, network directory service products, and groupware products. Many of the conventional replication facilities are limited in terms of what they can replicate. For instance, many conventional replicators can only replicate one type of logical structure (i.e., a file). Furthermore, the conventional replicators are limited in terms of the quantity of the logical structures that may be replicated at a time. In particular, many conventional replicators can only replicate one file at a time.

SUMMARY OF THE INVENTION

In accordance with a first aspect of a preferred embodiment of the present invention, a method is practiced in a distributed system having a replication facility and a number of computer systems that each include a storage device. In this method, a plurality of files are provided and organized into a tree. A single one of the files is replicated using the replication facility such that a copy of the file is stored in the storage device of a different computer system than the original copy of the file. A subtree of files of multiple levels is also replicated. The subtree is originally stored on the storage device of one of the computer systems. Replication is performed using the replication facility such that a copy of the subtree and its files are stored in the storage device in another of the computer systems.

In accordance with another aspect of the present invention, a first copy of a file is provided in one of the computer systems. A second copy of the file is provided in another of the computer systems. The first copy of the file is reconciled with the second copy of the file using a reconciler facility. The reconciliation ensures that the second copy of the file incorporates any changes made to the first copy of the file. A first copy of a group of files is provided in one of the computer systems, and a second copy of the group of files is provided in another of the computer systems. The reconciler facility is used to reconcile the first copy of the group of files with the second copy of the group of files so that the second copy of the group of files incorporates any changes made to the first copy of the group of files since last reconciled.

In accordance with a further aspect of the present invention, a first copy of a group of files is stored in the storage device of a first of the computer systems. A second copy of the group of files is stored in the storage device of a second of the computer systems. Changes are made to at least one of the files in the first copy of a group of files. The changes are propagated to the second group of files upon the occurrence of an event. Additional changes are made to at least one of the files in the first copy of a group of files, and these changes are also propagated to the second copy of a group of files upon the occurrence of another event.

In accordance with yet another aspect of the present invention, a first copy of a group of files is stored in the storage device of the first computer system. The second copy of the group of files is stored in the storage device of a second computer system. Any changes made to the first copy of the group of files are incrementally sent to the second computer system so that the changes may be made to the second copy of the group of files.

In accordance with an additional aspect of the present invention, a first set of files that are stored in one of the storage devices is specified to be replicated. A filter is specified for determining what files in the first set of files are to be replicated. The files specified by the filter are replicated using the replication facility to produce a second set of files.

In accordance with a still further aspect of the present invention, files having names are stored in the storage devices of the computer systems of the distributed system. A distributed namespace is provided. The distributed namespace comprises a logical organization of the names of the stored files. Selected portions of a group of files in the namespace are replicated to create new files holding the selected portions of the files.

In accordance with a further aspect of the present invention, a first copy of a set of files of a given class are stored in a first computer system. A second copy of the set of files are stored in a second computer system. The first copy of the set of files is reconciled with the second copy of the set of files using a class-specific reconciler that only reconciles files of the given class. The files may be stored as persistent objects, which are organized into classes. Objects and classes will be discussed below.

In accordance with another aspect of the present invention, an application program is run on one of the computer systems of a distributed system. A request is made within the application program to a private replication mechanism to replicate a set of files. Each of the files maintains a list of processes that are permitted to access the file. The set of files is replicated using the private replication mechanism to produce a new set of files without replicating the list of processes that are permitted to access the file.

In accordance with a further aspect of the present invention, a first copy of a group of files is provided in a first computer system and a second copy of the group of files is provided in a second computer system. Changes are made to the first copy of a group of files. An agent is provided for the first copy of group of files. Each agent has access rights to access and read the files in the first copy of the group of files. A reconciler is provided at the second computer system for reconciling the second copy of the group of files with the first copy of the group of files. A proxy is granted from the agent of the first copy of the group of files to the reconciler. The proxy grants the reconciler limited authority to access and read the files in the first copy of the group of files. The reconciler then reconciles the second copy of the group of files with the first copy of the group of files using the reconciler so that changes that were made to the first copy of group of files is also made to the second copy of group of files.

In accordance with a final aspect of the present invention, a method is practiced in a distributed system. In this method, heterogeneous file systems are provided in the distributed system. A storage manager is provided for each file system to manage access to the files held therein. In response to a request to reconcile a first set of files with a second set of files, access is granted to the first set of files by the storage manager for the file system that holds the first set of files and access is granted to the second set of files by the storage manager for the file system that holds the second set of files. The first object set is reconciled with the second object set under the control of the storage managers of the respective file systems that hold the first set of files and the second set of files.

DETAILED DESCRIPTION OF THE INVENTION

A preferred embodiment of the present invention provides a replication facility for use in a distributed environment. The replication facility supports weakly consistent replication of any subtree of persistent objects in the distributed namespace of the system. The replication facility may replicate single objects or may replicate logical structures that include multiple objects. The replication facility reconciles local copies of objects with remote copies of objects. Reconciliation occurs on a pair-wise basis such that each object in a local set of objects is reconciled with its corresponding object in the remote set of local objects. The reconciliation may occur over heterogeneous file systems.

Figure 1A:
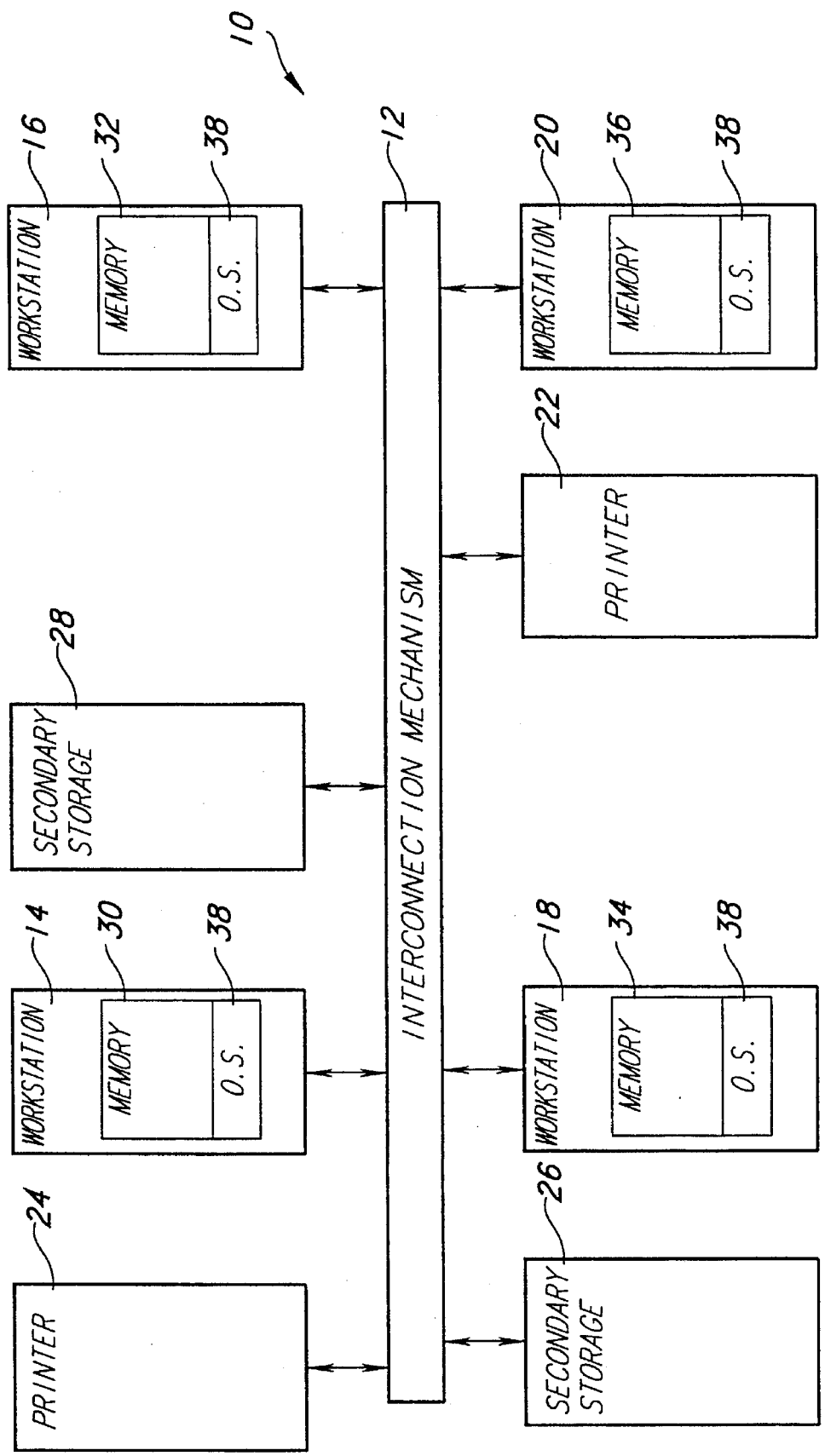
FIG. 1A is a block diagram of a distributed system suitable for practicing a preferred embodiment of the present invention.

FIG. 1A depicts a distributed system 10 that is suitable for practicing the preferred embodiment of the present invention. The distributed system 10 includes an interconnection mechanism 12, such as a local area network (LAN), wide area network (WAN), or other interconnection mechanism, that interconnects a number of different data processing resources. The data processing resources include workstations 14, 16, 18 and 20, printers 22 and 24, and secondary storage devices 26 and 28. Each of the workstations 14, 16, 18 and 20 includes a respective memory 30, 32, 34 and 36. Each of the memories 30, 32, 34 and 36 holds a copy of a distributed operating system 38. Each workstation 14, 16, 18 and 20 may implement a separate file system.

Those skilled in the art will appreciate that the present invention may be practiced on configurations other than the configuration shown in FIG. 1A. The distributed system 10 shown in FIG. 1A is intended to be merely illustrative and not limiting of the present invention. For instance, the interconnection mechanism 12 may interconnect a number of networks together that are running separate network operating systems.

The preferred embodiment of the present invention allows users and system administrators to replicate persistent "objects". An object, in this context, is a logical structure that holds at least one data field. Groups of objects with similar properties and common semantics are organized into object classes. A number of different object classes may be defined for the distributed system 10. Although the preferred embodiment of the present invention employs objects, those skilled in the art will appreciate that the present invention is not limited to an object-oriented environment; rather, the present invention may also be practiced in non-object-oriented environments. The present invention is not limited to replication of objects; rather, it is more generalized to support the replication of logical structures, such as files or file directories.

Figure 1B:
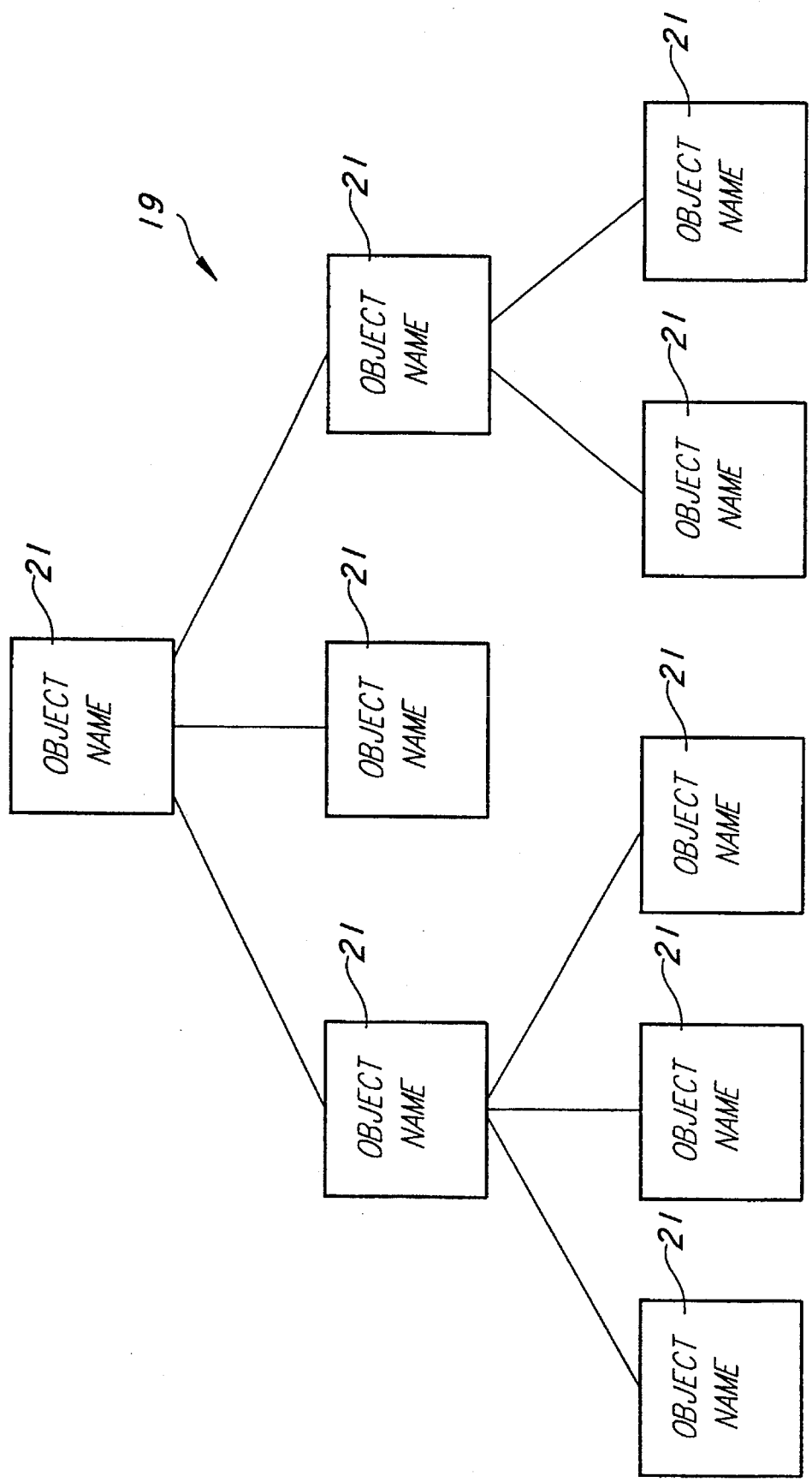
FIG. 1B is a diagram of a distributed namespace for a distributed system in accordance with the preferred embodiment of the present invention.

The operating system 38 includes a file system for storing the objects that are used in the preferred embodiment of the present invention. The objects are organized into a distributed namespace 19 (FIG. 1B). The distributed namespace 19 is a logical tree-like structure formed from the object names 21 stored in the file system of the operating system 38. The distributed namespace 19 illustrates the hierarchy among the named objects of the system 10 (FIG. 1A).

The replication facility of the preferred embodiment of the present invention provides not only for the duplication of objects so that objects may be distributed across the distributed system, but also provides for reconciliation of multiple copies of objects (i.e., multimaster replication). Reconciliation refers to reconciling an object with a changed object so that the object reflects the changes made to the changed object. For instance, suppose that a remote copy of an object has been changed and a local copy of the object has not yet been updated to reflect the changes. Each object not only has contents but also has a name and location within the distributed file system. Reconciliation involves reconciling the two copies of the object such that the local copy of the object is changed in a like fashion to how the remote copy of the object was changed. The term "replication," as used herein, refers to not only duplicating objects so that multiple copies of the objects are distributed across the distributed system 10, but also refers to reconciliation of the copies of the objects.

Before discussing the preferred embodiment of the present invention in more detail below, it is helpful to introduce a few key concepts that will be referenced below. An "object set" is a collection of objects that are grouped together for replication. An object set may include a single object or a sub-tree of objects. The object set is specified by the user or administrator who requests replication. A "replica set," in contrast, is a collection of systems which each own a local copy of an object set, and a "replica" is a member of a replica set.

To insulate the replication facility from the underlying physical storage system (e.g., the type of file system employed to store objects) and to provide extensibility, the preferred embodiment of the present invention adopts the abstraction of a replicated object store (ReplStore). The ReplStore abstraction allows the replication facility to be applied across heterogeneous file systems. The ReplStore presents a group of interfaces that must be supported for an underlying physical storage system to support replication facilities. In particular, only those objects that reside in object stores that support the ReplStore interfaces can be replicated. An interface is a named group of logically related functions. The interface specifies signatures (such as parameters) for the group of related functions provided by an interface. The interface does not provide code for implementing the functions; rather, the code for implementing the function is provided by objects or by other implementations. Objects that provide the code for an instance of an interface are said to "support" the interface. The code provided by an object that supports an interface must comply with the signature specified within the interface. Thus, in the example described above, the object store that stores the objects in the object set must support the ReplStore interfaces in order for the object set to be replicated. Implementations of the ReplStore interfaces are provided for each of the file systems within the distributed system 10 in order to support replication over each of the file systems.

Each ReplStore provides a mechanism for identifying replicated objects on the local volume. This mechanism is the replicated object ID (ROBID). The ROBID is an abstraction that encapsulates the identity as well as other information about an object that is being replicated. The ReplStore supports routines for serializing and deserializing ROBIDs. The ROBID of an object provides a mechanism for performing numerous operations. For instance, an object can be retrieved from storage using information contained in the ROBID. Further, a component name of an object can be derived from its ROBID.

Figure 2:
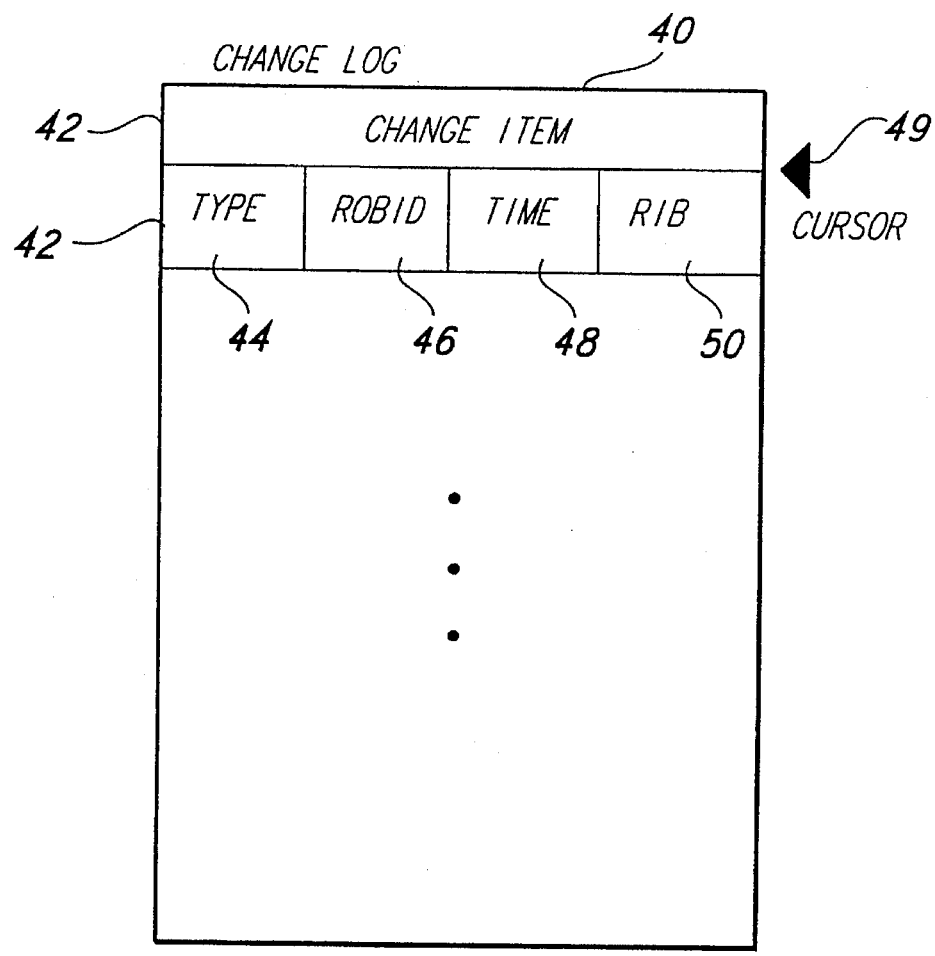
FIG. 2 is a block diagram of a change log used in the preferred embodiment of the present invention.

Each ReplStore maintains a replicated storage change log 40 (FIG. 2). The change log 40 includes a number of change items 42 that specify changes that have been made to objects in the object set. Each change item 42 includes a type field 44, a serialized ROBID field 46 for the object that is changed, a time field 48 indicating the time that the change occurred (local time) and a replication information block (RIB) field 50 holding a RIB that is associated with the change. In the embodiment described herein, there are five types of changes that may be specified within the type field 44. These changes are deletion, creation, modification, renaming, and moving. A deletion occurs when an object is deleted. Creation occurs when the object is created. A modification occurs when the contents of the object are modified in some way. A renaming occurs when the component name of the object is modified and moving occurs when the object is moved under a new parent in the distributed namespace of the system.

A cursor 49 is maintained within the change log 40 that acts as an index into the list of change items 42. The cursor 49 acts as a marker in the list of change items 42. In addition, a change log may include multiple cursors. The cursor 49 may take the form of a time stamp. The cursor 49 may, for example, identify the beginning of changes that have occurred after a point in time.

Figure 3:
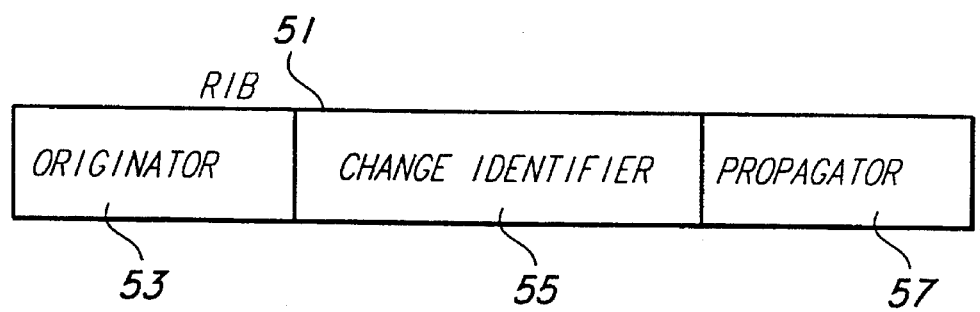
FIG. 3 is a block diagram of a replication information block (RIB) used in the preferred embodiment of the present invention.

Every object in an object set that is being replicated is stamped with an RIB 51 (FIG. 3). The RIB 51 has three fields: an originator field 57, a change identifier field 55, and a propagator field 57. The originator field 53 specifies where the last change to the object occurred. The change identifier field 55, in contrast, identifies the last change to the object relative to the originator identified within the originator field 53. Lastly, the propagator field 57 specifies the identity of the party who sent the change to the local site. When an object is changed locally, the RIB 51 associated with the object is modified to reflect the local site as the originator and the propagator. The change identifier is stamped appropriately.

Replication is useful for the distributed system 10 in that it provides load balancing and availability. Replication provides load balancing by having more than one copy of an object stored across the distributed system 10 to limit the load on any one copy of the object. Replication enhances availability by allowing multiple copies of important objects to be distributed across the system 10. The enhanced availability increases the fault resilience of the system. Specifically, by having copies of important objects distributed across the system 10, users are less affected by failures within the system that prevent or limit access to objects. The enhanced availability also enhances the performance of the system.

Figure 4:
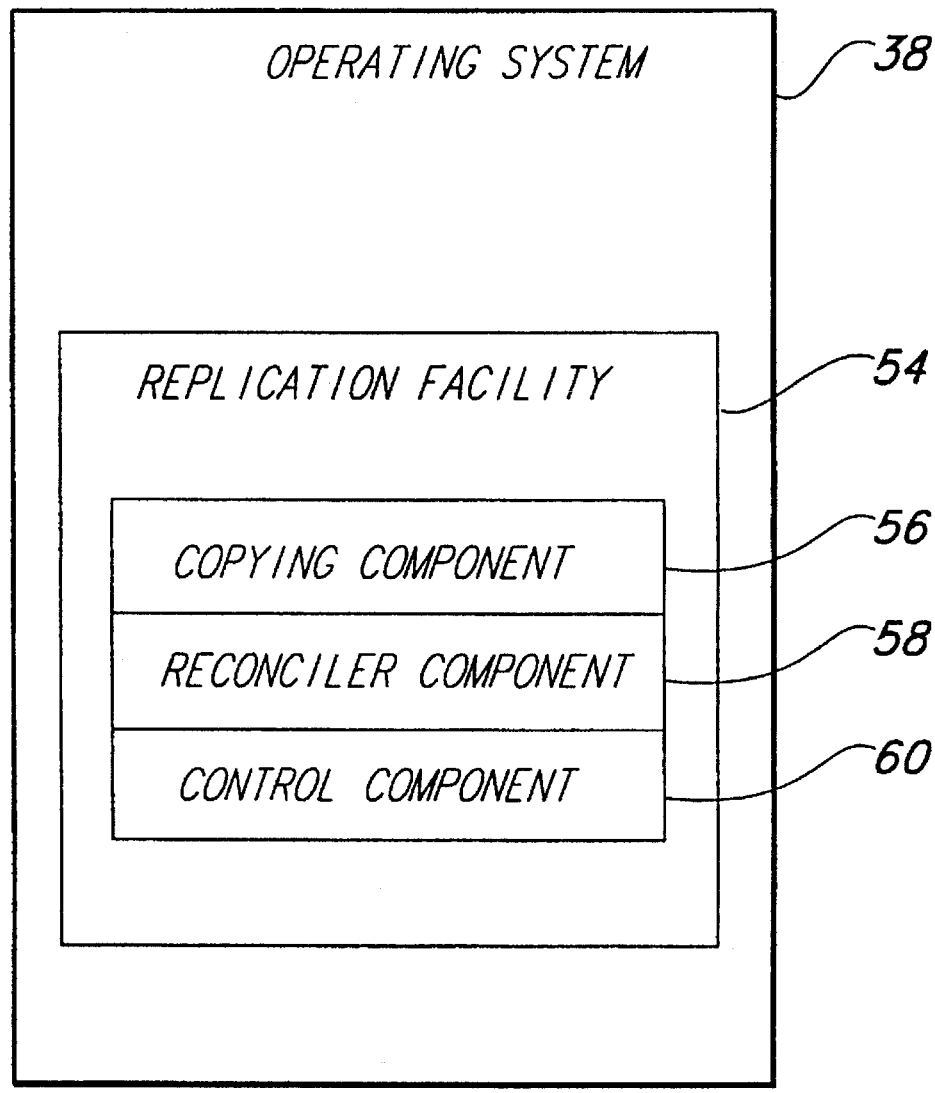
FIG. 4 is a block diagram illustrating the functional components of the replication facility used in the preferred embodiment of the present invention.

The preferred embodiment of the present invention is embodied in a replication facility 54 (FIG. 4) that is part of the operating system 38. Nevertheless, those skilled in the art will appreciate that the replication facility of the present invention may also be implemented in other environments, including graphical user interfaces. As shown in FIG. 4, the replication facility 42 includes three primary functional components: a copying component 56, a reconciler component 58 and a control component 60. The replication facility 54 uses the copying component 56 for duplication. In addition, the replication facility 54 reconciles copies of object sets using the reconciler component 58 to ensure that they are consistent with each other. This reconciliation insures a consistent view of the objects across the distributed system 10.

One level of control exerted by the control component 56 concerns how replication is invoked. Replication may be invoked manually or automatically. Manual invocation requires that an explicit request to replicate be made by a user or other party. The user or other party must specify the object set and the destination for replication. The destinations are not specified for each replication cycle; rather a replica connection is specified initially. The replica connection identifies the two replicas and the object set that are to be involved in replication. In contrast, automatic invocation occurs when replication is triggered by certain events 67 (see FIG. 5) or by the passage of a certain amount of time (which may be construed as a type of event). Replication may be prescheduled to occur at fixed time intervals. Another aspect of control exerted by the control mechanism concerns who may invoke replication. Replication may be invoked by an appropriately privileged party.

The preferred embodiment of the present invention provides two types of replication: public replication and private replication. Public replication refers to a process that may be performed only by appropriately privileged parties to produce a "public" copy of an object set. In public replication, each of the copies of the object set that are produced cooperates with the other copies to maintain consistency. The nodes in the namespace that store the public copies, in aggregate, form a public replica set, and the members of the set keep state information to maintain consistency among the copies. Access restrictions on the objects are preserved. Changes that occur in a public copy of an object set are reconciled with other public copies.

Private replication refers to a process for producing private copies of an object set. A private copy may be created by any party, including a non-administrator. Not all members of the replicated sets keep state information to maintain consistency among copies. Private replication will be discussed in more detail below.

Figure 5:
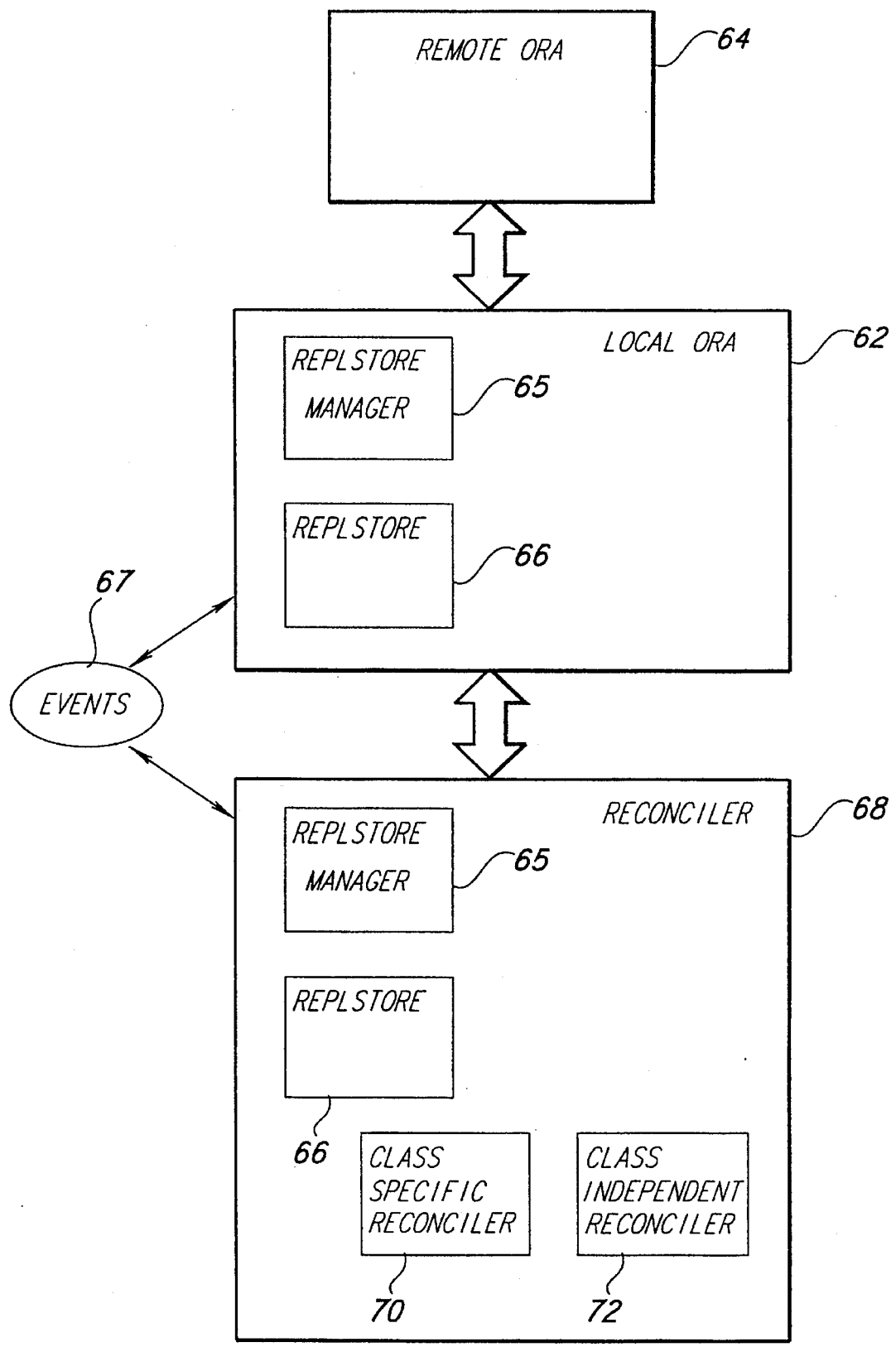
FIG. 5 is a diagram illustrating the interaction of elements that play a role in public replication in the preferred embodiment of the present invention.

A number of elements play a role in the replication process in the preferred embodiment of the present invention. FIG. 5 is a diagram illustrating the elements that may play a major role in the public replication process. Object replication agents (ORAs) 62 and 64 are replicator objects that act as agents on behalf of nodes in which object sets are stored to provide automatic support for replication. Each machine in the distributed system has its own ORA. The ORAs 62 and 64 may act as remote procedure call (RPC) servers that service requests made on behalf of remote clients or may alternatively be other types of reliable communication mechanisms that serve a similar role. A separate ORA 64 is provided for a local object and another ORA 64 is provided for the corresponding remote object in the public replication process. Local ORA 62 is responsible for loading a ReplStore DLL 66 and a ReplStore Manager DLL 65. The ReplStore Manager 65 is responsible for regulating access to the ReplStore 66. Clients call the ReplStore Manager 65 to load the appropriate ReplStore 66 for a given physical storage system. The ORAs 62 and 64 have a level of privilege that allows them to read and write all objects that are being replicated from a local object store. The ORAs 62 and 64 are responsible for replying to requests to exchange changes with other ORAs which maintain public replicas.

A reconciler 68 also plays a role in the public replication process. It acts as a counterpart to the local ORA 62 to reconcile the local object set with the remote object corresponding. The reconciler 68 is called by the local ORA 62 and is responsible for opening objects that are to be reconciled. Two types of reconciler objects may be called by the reconciler 68. Specifically, a class-specific reconciler 70 may be called or a default (i.e., class-independent) reconciler 72 may be called. The class-specific reconciler 70 reconciles objects that have class specific requirements on replication. The class specific recorder 70 is applied to only a class of objects. The class-independent reconciler 72 reconciles objects regardless of their class. Multiple class-independent reconcilers may be available in the system 10. For instance, each object set may have its own class-independent reconciler. Every replica set may be associated with its own class independent reconciler which is invoked whenever a class-specific reconciler is unavailable. Lastly, as mentioned above, events 67 may play a role in triggering replication.

Figure 6:
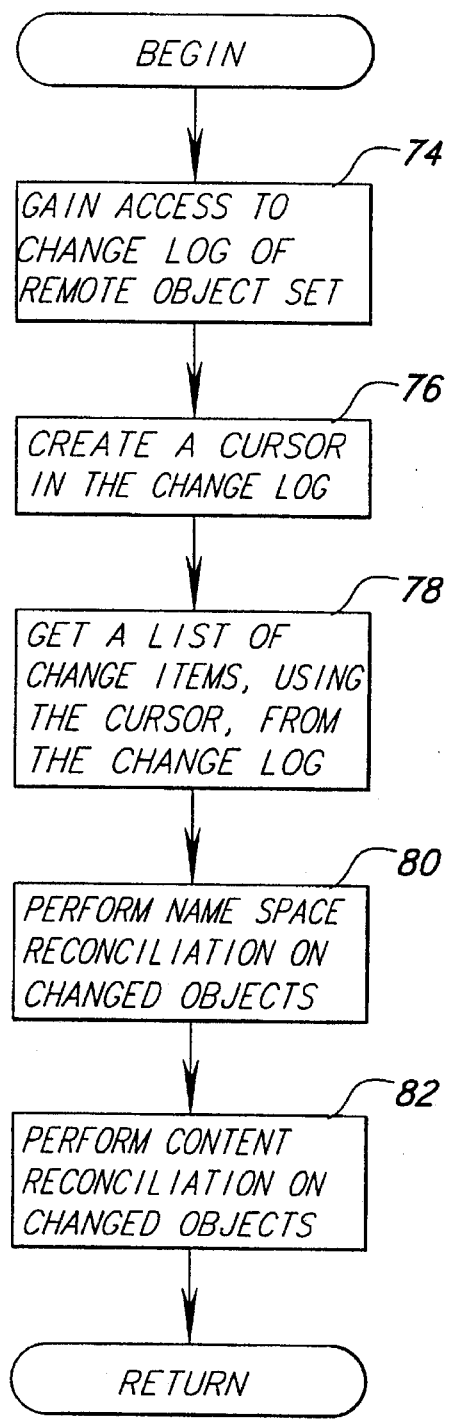
FIG. 6 is a flowchart of the steps performed in replication in the preferred embodiment of the present invention.

FIG. 6 is a flowchart of the steps performed for replication in the preferred embodiment of the present invention. Initially, access is gained to a change log 40 (FIG. 2) for a remote object set (step 74 in FIG. 6). In particular, when a local object set is to be reconciled with a remote object set, the local ORA 62 (FIG. 5) contacts the remote ORA 64 via a remote procedure call mechanism. The local ORA 62 contacts the remote ORA 64 to gain access to the change log 40. A cursor 49 (FIG. 2) is then created in the change log (step 76 in FIG. 6). Specifically, the local ORA 62 stores a time stamp indicating the time of the last reconciliation between the object sets and then passes this time stamp to the remote ORA 64 to be used as a cursor 49. The remote ORA 64 then passes this time stamp as a cursor into the remote change log 40. The cursor identifies items in the change log that have time stamps after the last reconciliation and, thus, are of interest for this replication cycle.

A list of change items are then obtained from the remote change log utilizing the cursor, to identify the change items that are for changes that have occurred after the last reconciliation. The remote ORA 64 screens the RIBs 51 of each of the change items 42 to insure that the remote ORA does not pass back to the local ORA 62 changes that originated at the local ORA (i.e., the remote ORA examines the originator field 53 of the RIBs) and examines the RIBs to insure that change items for changes that were propagated from the local ORA (i.e., the remote ORA examines the propagator field 57 of the RIBs) are not sent. The resulting change items are passed back to the local ORA 62 where they are stored persistently. The local ORA 62 then uses the reconciler 68 to perform namespace reconciliation (step 80) and content reconciliation (step 82) on the objects identified by the ROBIDs in the change items. In particular, the reconciler 56 reconciles each object that has changed in the remote object set with corresponding objects of the local object set. Any changes that have been made to the remote object are made to the corresponding local object. Whether the class-specific reconciler 70 or the class-independent reconciler 72 is used depends upon the source (i.e., remote copy of an object). A class specific reconciler 70 is used only if the remote copy of the object requires such a reconciler.

Namespace reconciliation is performed (see step 80 in FIG. 4) for any change recorded in a change item that is not strictly a content modification or that is not associated with a system property. Such changes include creations, deletions, moves, and renames. Namespace reconciliation occurs by comparing information obtainable by ROBIDs of local objects relative to information stored for corresponding remote objects. Many different ways for resolving name resolution conflicts may be used within the present invention. The preferred embodiment of the present invention, however, adopts rules. A first rule used by the preferred embodiment of the present invention to resolve namespace conflicts is to select a last modification over a previous modification. When an object is moved/renamed at one site to have a first name, and the same object is moved or renamed to another site to have a different name, the last occurring change is chosen so that the object assumes the name associated with the last change. A second rule is used to resolve namespace collisions. A namespace collision occurs when two different objects are created, moved, or renamed to have the same name. The second rule specifies that whichever object was created, moved, or renamed first is the name that is selected for the object at the local site.

Content reconciliation (see step 70 in FIG. 4) involves reconciling contents of a local object with a remote object so that the local object includes the modifications made to the remote object. By examining the changes in the change log, the local objects may be changed to have the same contents as the remote objects.

During replication, changes are propagated from one replica to another. Replication is "one way" in that the changes made to an initial copy of an object set are made to a second copy of the object set. There is no immediate reciprocal action to copy the changes made to the second copy of the object set to the first copy of the object set. Nevertheless, such propagation to the first copy of the object set may be performed. Given this one way nature of replication, each replica monitors how up to date a local copy of an object set is for a replica, cursors are maintained into partner change logs. At the completion of each exchange during reconciliation, the two replicas exchange cursor information.

Public replication poses a number of security issues. In general, reconcilers must be able to update objects in order to perform replication. The class-independent reconciler is a trusted system process, and, thus, does not pose a security risk. Class-specific reconcilers, however, are not trusted system processes, and thus pose a security threat. To help alleviate this security dilemma, the preferred embodiment of the present invention utilizes "proxies".

Figure 7:
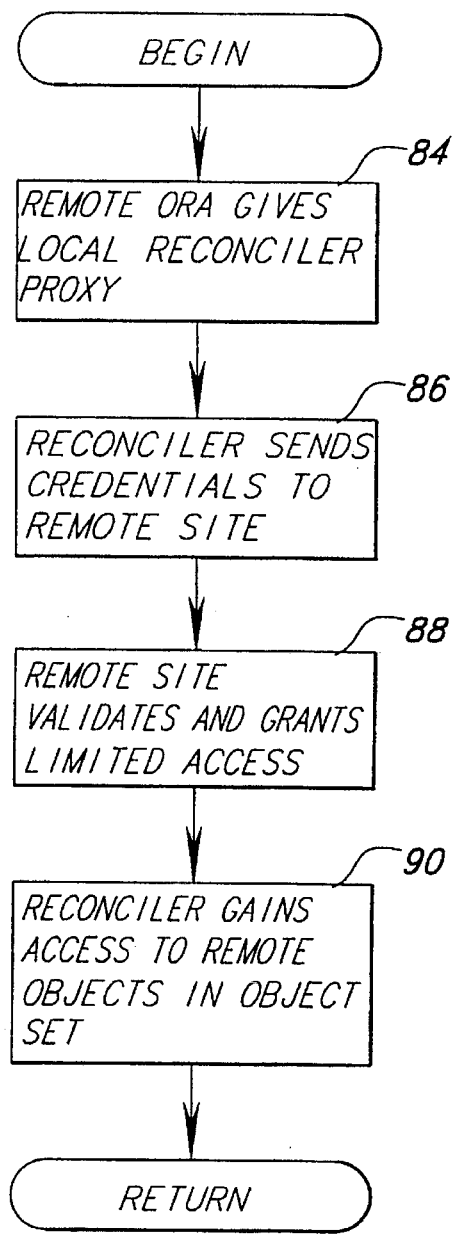
FIG. 7 is a flowchart illustrating the steps performed to provide security during replication in the preferred embodiment of the present invention.

A proxy is a delegation ticket that allows worker processes or remote processes that perform well-defined operations without having extraordinary privileges. The proxy packages credentials of the granting party and lends them to the parties seeking access to remote objects. The party seeking access may then step in the shoes of the granting party and access the necessary objects. These credentials may be encrypted. FIG. 7 is a flowchart of the steps performed to utilize a proxy in the preferred embodiment of the present invention. During the replication process, the remote ORA 64 (FIG. 5) gives a local reconciler 68 a proxy (step 84 in FIG. 7). As mentioned above, this proxy includes the appropriate credentials and access rights that are to be granted by the remote ORA to the local reconciler. The reconciler 68 then sends the credentials to the remote site (step 86 in FIG. 7). In other words, the reconciler 68 presents the proxy to the remote site. The remote site then validates the credentials, and if the credentials are valid, grants limited access to the objects within the remote copy of the object set in question (step 88). The reconciler 68 then gains access to the remote objects in the object set (step 80). The local reconciler's range of access, however, is limited to only that which is necessary to perform proper reconciliation. It should be appreciated that the present invention is not limited to exclusively using proxies. Any technique that grants secure access, such as making each ORA a member of a common access group that grants access rights, is permissible.

Most of the above discussion has focused on public replication. Private replication is similar to public replication but includes a number of differences. In private replication, the source of changes does not maintain a record of what objects were duplicated or changed. There is no state information maintained at the source. The source is not responsible for advising that changes have occurred. Accordingly, the resources that are required for public replication are not required. These characteristics make private replication especially appropriate for instances where manual control of replication is desired, or instances wherein the cost of maintaining a public copy of an object set is not warranted.

While the present invention has been described with reference to a preferred embodiment thereof, those skilled in the art will appreciate that the various changes in form and detail may be made without departing from the scope of the present invention as defined in the appended claims. For example, the present invention need not be implemented in an object-oriented environment and need not be practiced solely in a distributed system configuration like that shown in FIG. 1A. Furthermore, communication mechanisms other than RPC mechanisms may be used for remote interactions, and security mechanisms other than proxies may be employed.

We claim:

1. In a distributed system having a replication facility and a number of computer systems that each include a storage device, a method comprising the steps of:

providing a plurality of files organized into a tree of files;

replicating a single one of the files that is stored in the storage device of one of the computer systems using the replication facility so that a copy of the file is stored in the storage device of another of the computer systems; and replicating a subtree of files of multiple levels, from the tree of files, that is stored in the storage device of one of the computer systems using the replication facility so that a copy of the subtree of files is stored in the storage device of another of the computer systems.

2. The method of claim 1, further comprising the step of replicating the single file using the replication facility so that a copy of the is stored in of the storage device of a third of the computer systems in the distributed system.

3. The method of claim 1, further comprising the step of replicating the subtree using the replication facility so that a copy of the subtree is stored in the storage device of a third of the computer systems in the distributed system.

4. The method of claim 3 wherein the subtree being replicated includes at least three levels of files.

5. A distributed system comprising;

a plurality of computer systems, each computer system including a storage device for storing files;

a namespace manager for managing a namespace of the system a tree structure of names of the files; and a replication facility for replicating a subtree of the namespace that includes multiple levels.

6. In a distributed system having a reconciler facility and a number of computer systems, a method comprising the steps of:

providing a first copy of a file in one of the computer systems and a second copy of the file in another of the computer systems;

reconciling the first copy of the file with the second copy of the file using the reconciler facility so that the second copy of the file incorporates any changes made to the first copy of the file since last reconciled;

providing a first copy of a group of files in one of the computer systems and a second copy of the group of files in another of the computer systems; and reconciling the first copy of the group of files with the second copy of the group of files using the reconciler facility so that the second copy of the group of files incorporates any changes made to the first copy of the group of files since last reconciled.

7. The method of claim 6 wherein the step of reconciling the first copy of the group of files with the second copy of the group of files further comprises the step of reconciling on a pair by pair basis each file in the first copy of the group of files with a corresponding file in the second copy of the group of files.

8. In a distributed system having a replication facility and a number of computer systems, each including a storage device, a method comprising the steps of:

providing a first copy of a group of files stored in the storage device of a first of the computer systems;

providing a second copy of the group of files stored in the storage device of a second of the computer systems;

making changes to files in the first copy of the group of files;

propagating the changes to the second copy of the group of files upon occurrence of an event;

making additional changes to files in the first copy of the group of files; and propagating the additional changes to the second copy of the group of files upon occurrence of another event.

9. The method recited in claim 8 wherein the event is the elapsing of a predetermined time period.

10. The method recited in claim 9 where the other event is also the elapsing of a predetermined time period.

11. The method of claim 8 wherein the event is a request by the second computer system to receive the changes.

12. The method of claim 11 wherein the other event is a request by the second computer system to receive the additional change.

13. The method recited in claim 8, further comprising the step of reconciling the second copy of the group of files with the first copy of the group of files so that the second copy of the group of files incorporates the changes made to the first copy of the group of files.

14. The method recited in claim 13, further comprising the step of reconciling the second copy of the group of files with the first copy of the group of files so that the second copy of the group of files incorporates the additional changes made to the first copy of the group of files.

15. In a distributed system having a replication facility and computer systems that each include a storage device, a method comprising the steps of:

storing files, having names, in the storage devices of the computer systems;

providing a distributed namespace comprising a logical organization of the names of the stored files; and replicating selected portions of a group of files stored in the storage devices of one of the computer systems and whose names form a part of the distributed namespace using the replication facility to create new files holding the selected portions of the files.

16. The method recited in claim 15, further comprising the step of replicating the new files to distribute the new files across at least a portion of the computer systems of the distributed system.

17. In a distributed system having a first computer system and a second computer system, a method comprising the steps of:

providing a first copy of a set of files of a given class that are stored in the first computer system;

providing a second copy of the set of files of the given class that are stored in the second computer system;

reconciling the first copy of the set of files with the second copy of the set of files using a class-specific reconciler that only reconciles files of the given class.

18. The method recited in claim 17, further comprising the steps of:

making changes to the first copy of the set of files;

reconciling the first copy of the set of files with the second copy of the set of files using a class-independent reconciler that reconciles files regardless of class.

19. In a distributed system having a private replication mechanism and computer systems for running processes that each include a storage device, a method comprising the steps of:

running an application program on one of the computer systems;

making a request to the private replication mechanism to replicate a set of files within the application program, each of the files maintaining a list of processes that are permitted to access the file; and replicating the set of files using the private replication mechanism to produce a new set of files without replicating, for each file, the list of processes that are permitted to access the file.

20. In a distributed system having a first computer system and a second computer system, a method comprising the steps of:

providing a collection of files at the first computer system;

in response to a request to replicate the collection of files to the second computer system, determining whether all or none of the files in the collection should be replicated;

where it is determined that all of the files in the collection should be replicated, replicating all of the files in the collection so that a replica of the collection is provided at the second computer system; and where it is determined that none of the files in the collection should be replicated, replicating none of the files in the collection.

21. In a distributed system having a first computer system and a second computer system, a method comprising the steps of:

providing a first copy of a group of files in the first computer system;

providing a second copy of the group of files in the second computer system;

making changes to the first copy of the group of files;

providing an agent for the first copy of the group of files, wherein each agent has access rights to access and read the files in the first copy of the group of files;

providing a reconciler at the second computer system for reconciling the second copy of the group of files with the first copy of the group of files;

granting a proxy to the reconciler from the agent of the first copy of the group of files, said proxy granting the reconciler limited authority to access and read the files in the first copy of the group of files; and reconciling the second copy of the group of files with the first copy of the group of files using the reconciler so that the changes made to the first copy of the group of files are made to the second copy of the group of files.

22. In a distributed system, a method comprising:

providing heterogeneous file system in the distributed system;

providing a storage manager for each file system to manage access to files in the file system;

in response to a request to reconcile a first set of files with a second set of files, granting access to the first set of files by the storage manager for the file system that holds the first set of files and granting access to the second set of files by the storage manger for the file system that holds the second set of files; and reconciling the first set of files with the second set of files under control of the storage managers of the respective file systems holding the first set of files and the second set of files.

23. The method of claim 22 wherein each copy of a file stored in the file systems is provided a storage-specific identifier by the storage manager.

24. The method of claim 22 wherein each storage manager reports changes to the files in its file system.

25. The method of claim 24 wherein the changes include deletions of files.

26. The method of claim 24 wherein the changes include renaming of files.

27. The method of claim 24 wherein the changes include moving of files in the distributed system.

28. The method of claim 24 wherein the changes are reported to a change log and wherein the step of reconciling is performed using the change log.

29. The method of claim 22 wherein each copy of a file is assigned to a unique identifier and wherein the step of reconciling includes comparing identifiers to determine which files are to be reconciled.

* * * * *